United States Patent
Son et al.

(10) Patent No.: US 9,483,680 B2
(45) Date of Patent: Nov. 1, 2016

(54) METHOD OF RECOGNIZING CONTACTLESS FINGERPRINT AND ELECTRONIC DEVICE FOR PERFORMING THE SAME

(71) Applicants: Samsung Electronics Co., Ltd., Gyeonggi-do (KR); Industry-Academic Cooperation Foundation, Yonsei University, Seoul (KR)

(72) Inventors: Byung-jun Son, Seoul (KR); Jai-hie Kim, Seoul (KR); Jin-woo Yoo, Gyeonggi-do (KR); Dong-hyun Noh, Seoul (KR); Won-june Lee, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 32 days.

(21) Appl. No.: 14/551,842

(22) Filed: Nov. 24, 2014

(65) Prior Publication Data

US 2015/0146943 A1    May 28, 2015

(30) Foreign Application Priority Data

Nov. 22, 2013 (KR) ........................ 10-2013-0143253

(51) Int. Cl.
*G06K 9/00* (2006.01)

(52) U.S. Cl.
CPC ....... *G06K 9/00033* (2013.01); *G06K 9/00912* (2013.01)

(58) Field of Classification Search
None
See application file for complete search history.

(56) References Cited

U.S. PATENT DOCUMENTS

| | | | |
|---|---|---|---|
| 2011/0150303 A1* | 6/2011 | Dinerstein ......... | G06K 9/00033 382/124 |
| 2012/0076369 A1* | 3/2012 | Abramovich ...... | G06K 9/00033 382/124 |
| 2014/0003677 A1* | 1/2014 | Han ................... | G06K 9/00006 382/124 |
| 2014/0147035 A1* | 5/2014 | Ding ...................... | G06F 3/017 382/164 |

FOREIGN PATENT DOCUMENTS

KR    10-2009-0020132    2/2009

* cited by examiner

*Primary Examiner* — David F Dunphy
(74) *Attorney, Agent, or Firm* — The Farrell Law Firm, P.C.

(57) ABSTRACT

A method of recognizing a contactless fingerprint is provided. The method includes displaying a guide screen for recognizing the contactless fingerprint on a display, receiving an input image of a target object positioned according to the guide screen by using a camera, and determining whether the received input image is suitable for fingerprint recognition.

17 Claims, 6 Drawing Sheets

METHOD OF RECOGNIZING CONTACTLESS FINGERPRINT AND ELECTRONIC DEVICE FOR PERFORMING THE SAME

PRIORITY

This application claims priority under 35 U.S.C. §119(a) to Korean Patent Application Serial No. 10-2013-0143253, which was filed in the Korean Intellectual Property Office on Nov. 22, 2013, the entire disclosure of which is incorporated herein by reference.

BACKGROUND OF THE INVENTION

1. Field of the Invention

The present invention relates generally to a method of recognizing a contactless fingerprint and an electronic device for performing the same, and more particularly, to a method of recognizing a contactless fingerprint using an electronic device configured to display a guide screen on a display of the electronic device for recognizing the contactless fingerprint.

2. Description of the Related Art

A fingerprint recognition system of the related art needs a high resolution fingerprint recognition image so as to obtain a high recognition rate. A method of acquiring an image, on a mobile terminal for example, may include a user contacting his or her finger to a separate dedicated sensor so as to acquire a consistent high resolution fingerprint recognition image. When the user uses a contact fingerprint recognition system that uses the dedicated sensor, additional expense is necessary for providing the dedicated sensor to a mobile terminal, and fingerprint recognition performance may be influenced by various factors, such as the dryness of a user's hand or distortion of a fingerprint pattern according to a force applied to the dedicated sensor when a fingerprint image is acquired.

Meanwhile, there is a method of acquiring the fingerprint image of a finger in a contactless manner at a predetermined distance from a mobile terminal, e.g., a cellular phone, without a separate dedicated sensor by using a camera embedded in a mobile device. The contactless fingerprint image acquisition method may acquire various fingerprint images. However, with such a method the same user's finger is captured according to a posture of the user's finger, a distance between the camera and the user's finger when an image is captured, and a capturing angle of the camera, and thus it is often difficult to obtain a consistent feature when extracting a feature for fingerprint recognition.

Therefore, performance of contactless fingerprint recognition is inferior to that of contact fingerprint recognition.

SUMMARY OF THE INVENTION

The present invention has been designed to address at least the problems and/or disadvantages described above and to provide at least the advantages described below.

In accordance with an aspect of the present invention, a method of recognizing a contactless fingerprint is provided. The method includes displaying a guide screen for recognizing the contactless fingerprint on a display, receiving an input image of a target object positioned according to the guide screen by using a camera, and determining whether the received input image is suitable for fingerprint recognition.

In accordance with another aspect of the present invention, an electronic device is provided. The electronic device includes a display unit configured to display a guide screen for recognizing a contactless fingerprint on a display, an image input unit configured to receive an image of a target object positioned according to the guide screen by using a camera, and a determination unit configured to determine whether the received input image is suitable for fingerprint recognition.

In accordance with another aspect of the present invention, a non-transitory computer readable recording medium having recorded thereon a program for executing a method of recognizing a contactless fingerprint is provided. The method including displaying a guide screen for recognizing the contactless fingerprint on a display, receiving an input image of a target object positioned according to the guide screen by using a camera, and determining whether the received input image is suitable for fingerprint recognition.

BRIEF DESCRIPTION OF THE DRAWINGS

The above and other aspects, features, and advantages of certain embodiments of the present invention will be more apparent from the following detailed description when read in conjunction with the accompanying drawings, in which.

DETAILED DESCRIPTION OF EMBODIMENTS OF THE INVENTION

Various embodiments of the present invention are described in detail below with reference to the accompanying drawings. The same reference numbers are used throughout the drawings to refer to the same or like parts. Additionally, detailed descriptions of well-known functions and structures incorporated herein may be omitted to avoid obscuring the subject matter of the present invention. As used herein, the term "and/or" includes any and all combinations of one or more of the associated listed items.

Figure 1:
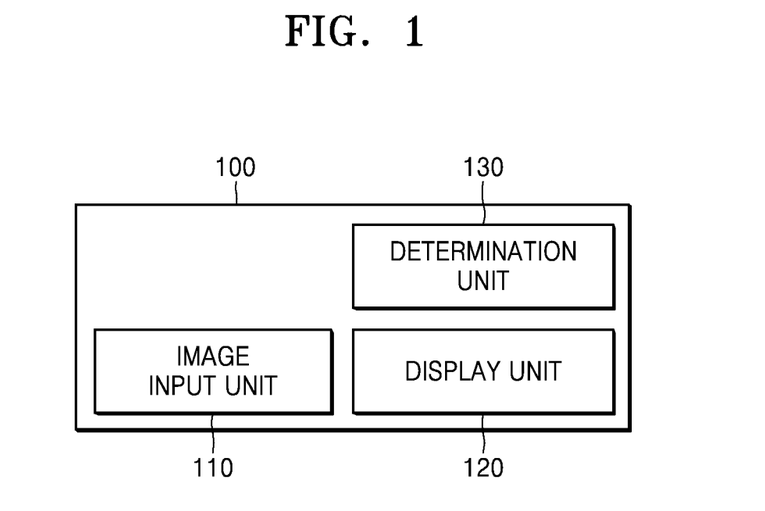
FIG. 1 is a block diagram of an electronic device, according to an embodiment of the present invention.

FIG. 1 is a block diagram of an electronic device 100, according to an embodiment of the present invention.

Referring to FIG. 1, the electronic device 100 includes an image input unit 110, a display unit 120, and a determination unit 130. The electronic device 100 may be a mobile device such as a smart phone, tablet, etc.

The image input unit 110 receives an input image of a target object by using a camera included in the electronic device 100, but is not limited thereto. The input image may be received by using an image input device outside of the electronic device 100. In this regard, the image input unit 110 receives the input image by using a camera in real time.

The display unit 120 displays a guide screen to recognize a fingerprint. In this regard, the displayed guide screen may be an image including an outline of an average user's hand. The guide screen may be displayed at an inclination of a predetermined angle with respect to a vertical central axis of the electronic device 100 on which the guide screen is displayed. If the target object, for example, a user's hand, is disposed in a predetermined place in the front of a camera according to the guide screen, the image input unit 110 receives the input image of the target object by using the camera.

Also, the display unit 120 provides a preview for the received input image in real time. Therefore, the user can place the target object, for example, a user's hand, in a predetermined place in the front of a camera according to the guide screen.

The determination unit 130 determines whether the input image received by the image input unit 110 is appropriate for fingerprint recognition. The determination unit 130 determines whether the input image indicates the user's hand, and, when the received input image is determined to indicate the user's hand, determines whether the received input image is appropriate for the fingerprint recognition according to a location of the target object in the image. For example, the determination unit 130 determines whether the received input image is appropriate for the fingerprint recognition according to a location of the end part of the user's finger on the image or a location between the user's fingers on the image.

The determination unit 130 establishes whether the received input image is appropriate for the fingerprint recognition by separating the foreground and background based on analyzed color value difference. The determination unit 130 establishes an ROI in the received input image with respect to the target object when analyzing the color value difference in the navigation region, calculates an average value of color values included in the established ROI, calculates a difference between the calculated average value of the color values and a color value of a partial region of the navigation region, and analyzes the color value difference in the navigation region based on the calculated color value difference. In more detail, the determination unit 130 analyzes the color value difference in the navigation region by detecting a region having a predetermined value that is the calculated color value difference in correspondence to the partial region included in the navigation region.

For example, the determination unit 130 establishes the navigation region in the input image received by the image input unit 110 in correspondence to a region that crosses an outline of a hand image displayed on the guide screen. The determination unit 130 establishes the ROI region, calculates the average value of the color values included in the established ROI, and calculates the color value difference between the calculated average value of the color values and the color value of the partial region of the navigation region. The determination unit 130 analyzes the calculated value difference in the navigation region based on the calculated color value difference, and determines whether the input image received by the image input unit 110 is appropriate for the fingerprint recognition based on the analyzed color value difference.

Meanwhile, the determination unit 130 establishes a navigation region of the input image with respect to the target object, detects an edge in the navigation region, and determines whether the image is appropriate for the fingerprint recognition based on the detected edge. The determination unit 130 calculates a brightness difference between a partial region of the navigation region and a neighboring region of the partial region when detecting the edge in the navigation region, and detects the edge based on the calculated difference in the brightness value.

For example, the determination unit 130 establishes a navigation region in the input image received by the image input unit 110 in correspondence to the region that crosses the outline of the hand image displayed on the guide screen. The determination unit 130 calculates a difference in the brightness value between a partial region of the navigation region and a neighboring region of the partial region and detects an edge based on the calculated difference in the brightness value.

The determination unit 130 determines that the input image received by the image input unit 110 is appropriate for the fingerprint recognition when a difference in the color value between a region of the navigation region and the neighboring region of the region is greater than a difference in the color value between another partial region of the navigation region and the neighboring region of the other partial region, and the region of the specific region of the navigation region is determined to be within the specific region.

For example, the determination unit 130 establishes the navigation region in the input image received by the image input unit 110 in correspondence with a region that crosses a plurality of finger shapes displayed on the guide screen. The determination unit 130 determines whether the region of the navigation region is within the specific region when the difference in the color value between a region of the navigation region and the neighboring region of the region is greater than the difference in the color value between another region of the navigation region and the neighboring region of the other region. In this regard, the specific region is a region in a received input image corresponding to a region including an outline between the finger shapes displayed on the guide screen. The determination unit 130 determines that the input image received by the image input unit 110 is appropriate for the fingerprint recognition when a region of the navigation region is within the specific region.

The determination unit 130 determines whether the input image received by the image input unit 110 is an image indicating the user's hand. That is, the determination unit 130 recognizes the user's hand from the input image with respect to a target object received from a camera. For example, the determination unit 130 determines whether the input image received by the image input unit 110 is an image indicating the user's hand by using AAM (Active Appearance Model) or ASM (Active Shape Model). As defined herein, ASM means a statistical model of shape of an object which is transformed iteratively to correspond to the object in new image. As defined herein, AAM means a computer vision algorithm which matches new image with a statistical model for appearance and shape of the object. AAM determines whether an image is an image indicating the user's hand, as opposed to ASM, which uses texture information of the target object; AAM provides a more accurate model of the user's hand when compared to ASM. Meanwhile, the determination unit 130 determines whether an input image is an image indicating a user's hand by using 2 dimension skeleton model of a hand region.

Figure 2:
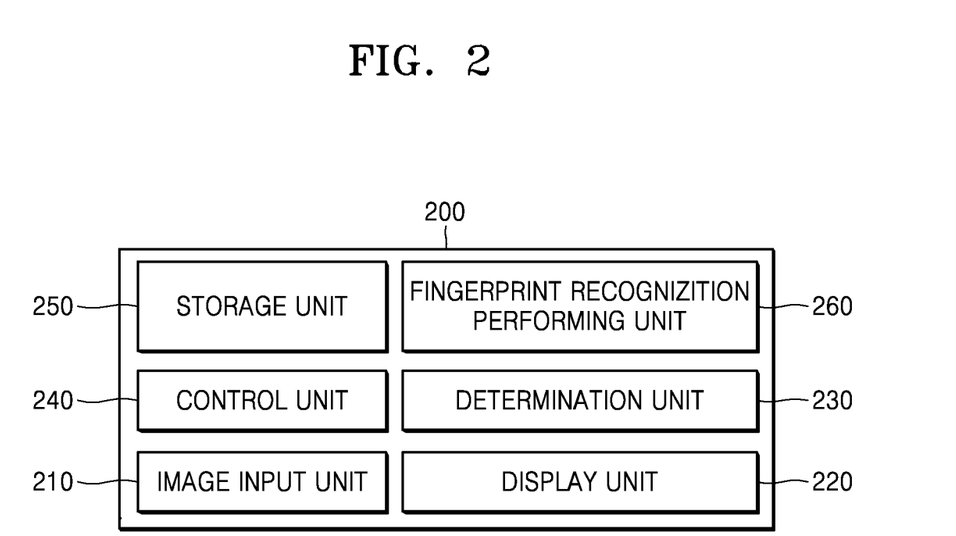
FIG. 2 is a block diagram of an electronic device, according to another embodiment of the present invention.

FIG. 2 is a block diagram of an electronic device 200, according to another embodiment of the present invention.

Referring to FIG. 2, the electronic device 200 includes an image input unit 210, a display unit 220, a determination unit 230, a control unit 240, a storage unit 250, and a finger print recognition performing unit 260. The electronic device 200 may be a mobile device such as a smart phone, tablet, etc.

Operations performed by the image unit 210, the display unit 220, and the determination unit 230 of FIG. 2 are similar to the operations performed by the image acquisition unit 110, the display unit 120, and the determination unit 130 of FIG. 1, and thus detailed descriptions thereof are omitted.

The control unit 240 controls a guide screen to be displayed on the display unit 220 when a user's hand is recognized from an input image with respect to a target object received by a camera. The control unit 240 adjusts the focus of a camera. The control unit 240 controls the storage unit 250 to store information about the feature of fingerprint extracted by fingerprint recognition performing unit 260. The control unit 240 controls the guide screen to be inclined at a predetermined angle with respect to a vertical central axis of the electronic device 200 on which the guide screen is displayed and to be displayed on the display unit 220.

The storage unit 250 stores information about the feature of the fingerprint.

The fingerprint recognition performing unit 260 performs the finger print recognition with respect to the input image received by the input image unit 210. Specifically, the finger recognition performing unit 260 performs the fingerprint recognition with respect to the input image determined to be appropriate for fingerprint recognition by the determination unit 230. In this regard, the fingerprint recognition performing unit 260 extracts the feature of fingerprint included in the input image received by the image input unit 210.

Figure 3:
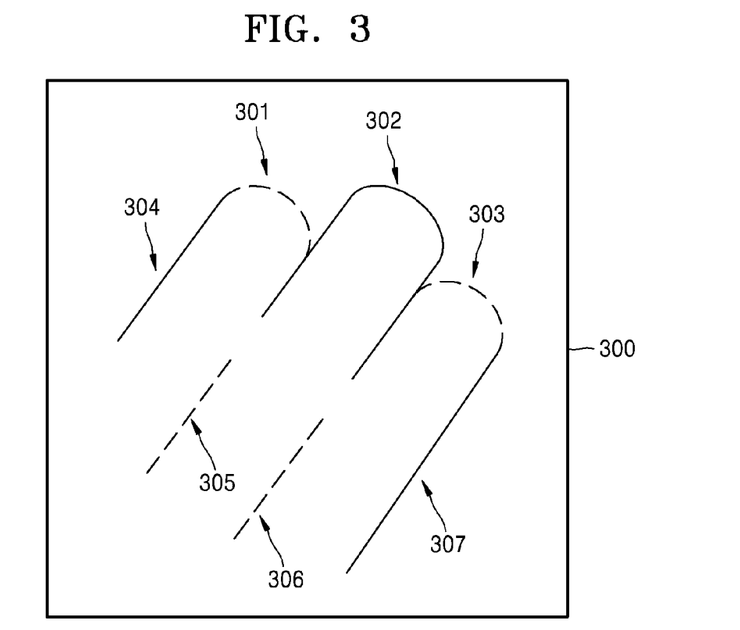
FIG. 3 is a diagram for illustrating a guide screen for acquiring fingerprints of a user's left hand, according to an embodiment of the present invention.

FIG. 3 is a diagram for illustrating a guide screen for acquiring fingerprints of a user's left hand, according to an embodiment of the present invention.

Referring to FIG. 3, the guide screen 300 includes a partial shape of an average user's left fingers. When a fingerprint recognition image is acquired, the guide screen 300 may be inclined in a clockwise direction on a display. The inclined guide screen 300 is displayed on the display, and thus a user may conveniently place his/her hand in front of a camera according to the guide screen 300, thereby acquiring the fingerprint recognition image without any difficulties.

Meanwhile, a fingerprint region corresponds to a top first joint part of a finger. An electronic device, e.g., electronic devices 100, 200, extracts the top first joint part from the acquired fingerprint recognition image to recognize a fingerprint of the finger. When the user places his/her hand according to the guide screen 300, the fingerprint region may be acquired as large as possible within a focusing range of the camera. The fingerprint region may be acquired from one finger or a plurality of fingers.

Referring to FIG. 3, the electronic device displays the guide screen 300 including an outline guide of an index finger, a middle finger, and a ring finger to acquire fingerprints of the index finger, the middle finger, and the ring finger. In general, since users' fingers are different in length and size, it is difficult to exactly place all of the index finger, the middle finger, and the ring finger in the outline guide, and thus the electronic device emphasizes a middle finger top part outline 302 by using an unbroken line to allow the user to fit his/her fingers in the outline guide with respect to the middle finger. Meanwhile, if the user places the middle finger in accordance with the middle finger top part outline 302, the electronic device displays the outline guides of the index finger and the ring finger such that the index finger and the ring finger may be naturally placed. The electronic device displays a top part outline 303 of the ring finger as a broken line such that the user may place his/her finger slightly beyond the broken line in consideration of a length of a finger varying according to different users, while the electronic device may display an outside edge 307 of the ring finger as the unbroken line such that the ring finger may not go beyond the unbroken line and may be placed in a position sufficient to acquire the fingerprint image. Likewise, the electronic device may display a top part outline 301 of the index finger as the broken line such that the user may place his/her finger slightly beyond the broken line in consideration of the length of the finger varying according to different users, while the electronic device may display an outside edge 304 of the index finger as the unbroken line such that the index finger may not go beyond the unbroken line and may be placed in the position enough to acquire the fingerprint image. The electronic device may display an outline 305 between the middle finger and the ring finger and an outline 306 between the index finger and the middle finger in the broken line such that the user may place the index finger to slightly go beyond the broken line in consideration of the length of the index finger varying according to different users. That is, according to the guide screen 300 displayed using the broken line or the unbroken line, the user may place his/her fingers in such a manner that they do not go beyond the unbroken lines 302, 304, and 307 displayed and to slightly go beyond the broken lines 301, 303, 305, and 306. Thus, the user may place his/her hand on a position suitable for acquiring the fingerprint image while looking at the displayed guide screen 300, thereby increasing a fingerprint recognition rate.

Figure 4:
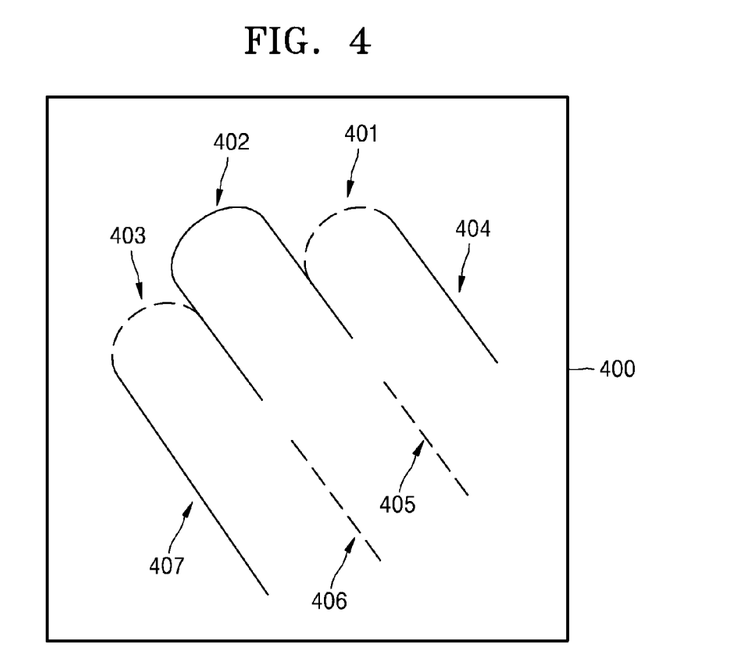
FIG. 4 is a diagram for illustrating a guide screen for acquiring fingerprints of a user's right hand, according to an embodiment of the present invention.

FIG. 4 is a diagram for illustrating a guide screen 400 for acquiring a fingerprint of a user's right hand, according to an embodiment of the present invention.

Referring to FIG. 4, the guide screen 400 includes a partial shape of an average user's right fingers. When a fingerprint recognition image is acquired, the guide screen 400 may be inclined in a counterclockwise direction on a display.

The guide screen 400 for acquiring the fingerprint of the user's right hand of FIG. 4 corresponds to the guide screen 300 for acquiring the fingerprint of the user's left hand of FIG. 3, and thus a detailed description thereof is omitted.

Figure 5:
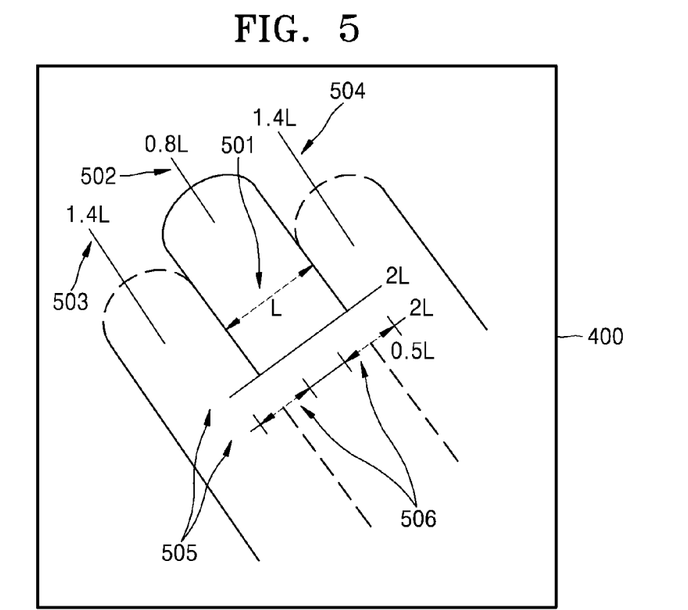
FIG. 5 is a diagram for illustrating a process of determining an image suitable for fingerprint recognition on a right hand guide screen, according to an embodiment of the present invention.

FIG. 5 is a diagram for illustrating a process of determining an image suitable for fingerprint recognition on a right hand guide screen, according to an embodiment of the present invention.

Referring to FIGS. 3 and 4 again, positions of lines used to extract a signal of an input image received by a camera may be established at top end parts 301-303 and 401-403 of an outline guide of an index finger, a middle finger, and a ring finger and at parts 305-306 and 405-406 across the outline guide such that actually captured fingers of user's right and left hands may be correctly placed according to a guide screen.

Referring to FIG. 5, a width of a middle finger guide 501 is L, lines may be placed in consideration of an appropriate ratio with respect to the width L, and a signal of an input image on the lines may be analyzed in consideration of a difference between lengths of fingers that vary according to users. In the illustrated embodiment, a line 502 having a length of 0.8L may be placed on the top edge part 402 of the middle finger guide, and lines 503 and 504 having a length of 1.4 L that is greater than the line 502 may be placed on the top gradient parts 401 and 403 of the index finger and ring finger guides, respectively. At the same time, a line 505 having a length of 2 L may be placed across a finger guide, while two or more lines 506 may be established so as to exactly estimate boundaries of fingers.

A process of determining an image suitable for fingerprint recognition on a left hand guide screen corresponds to the process of determining the image suitable for the fingerprint recognition on the right hand guide screen of FIG. 5, and thus a detailed description thereof is omitted.

Positions of lines established on the left hand guide screen 400 are analogous to those of the lines established in FIG. 5 in accordance with FIG. 3.

With respect to the process of determining, by the electronic device, the image suitable for the fingerprint recognition based on the established positions of the lines, if a input fingerprint recognition image is received in accordance with a shape of a guide screen (e.g., guide screens 300, 400), a 1-dimensional (D) image signal on the line 505 across the finger guide indicates a gradient signal, which gradient signal value is large between fingers. In some embodiments, the image suitable for the fingerprint recognition is determined by analyzing a gradient signal of the lines across the finger guide.

For example, a gradient signal value "Gradient(x)" of an image signal at a point on the line 505 across the finger guide may be calculated according to Equation (1) below:

$$\text{Gradient}(x) = |Y(x+1) - Y(x-1)| \quad (1).$$

In Equation (1) above, Y denotes brightness, and x denotes a position of a pixel on a line from a reference pixel. A difference between neighboring pixels on the line and a Y value is calculated according to Equation (1). If an input finger image is received in accordance with a guide shape, the finger image has a high gradient signal value between the user's fingers, and a low gradient signal value on the user's fingers. Thus, an electronic device determines whether an edge point between the user's fingers is present from the established line 505. The electronic device also determines a position of the edge point between the user's fingers, determines that the position of the gradient point is present in a region near an edge point of the finger shape on the finger guide, and determines that the finger image is suitable for the fingerprint recognition.

With respect to the process of determining whether the image is suitable for the fingerprint recognition based on the established positions of the lines, if a fingerprint recognition image is acquired in accordance with a shape of the guide screen, the 1-D image signal shows a pattern of an image signal indicating a user's hand on a background image signal from a left top to a right bottom in each of the lines 502-504 on an established finger top edge. The electronic device analyzes the pattern of the image signal on lines placed on a finger top edge part and determines if the image is suitable for the fingerprint recognition. Specifically, the electronic device determines whether the image is suitable for the fingerprint recognition by checking that the input image matched with the guide screen is placed.

The electronic device may use a pattern information difference between an ROI including a skin color value of a finger and an optional point of a line to analyze the pattern of the image signal on lines placed on the finger top edge part.

Figure 6:
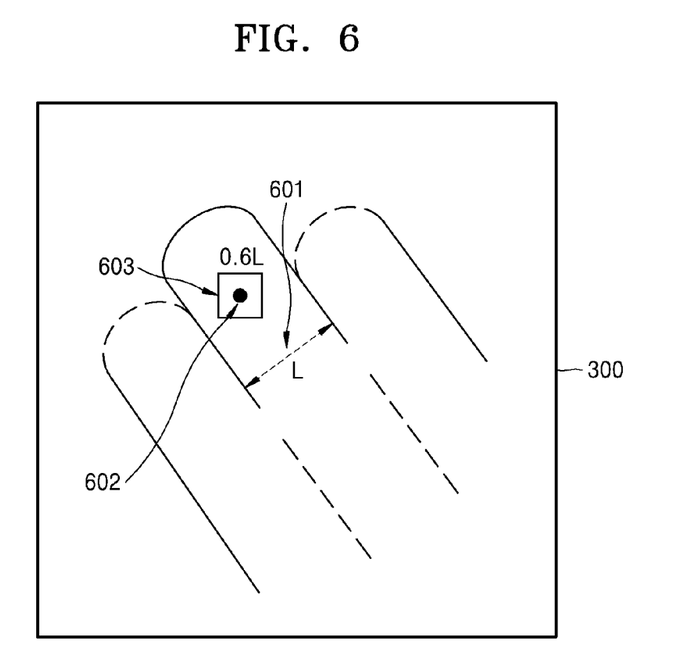
FIG. 6 is a diagram for illustrating a process of establishing a region of interest (ROI) for analyzing an image signal on an established line, according to an embodiment of the present invention.

FIG. 6 is a diagram for illustrating a process of establishing an ROI for analyzing an image signal on an established line, according to an embodiment of the present invention.

Referring to FIG. 6, the ROI may be established as a region having a suitable size in a center of gravity 602 part of a middle finger guide. For example, when a width 601 of the middle finger guide is L, a rectangular region 603 having a length of 0.6 L in width and height may be established as the ROI. A signal pattern value "Dist" of a point on lines established on the finger top edge parts 502-504 of a finger guide may be calculated according to Equation (2) below.

$$Dist = \sqrt{w_l(Y_{ROI} - Y_{in})^2 + (Cb_{ROI} - Cb_{in})^2 + (Cr_{ROI} - Cr_{in})^2} . \quad (2)$$

In Equation (2) above, a Y value from among color values Y, Cb, and Cr denotes brightness, and Cb and Cr denote chroma. $Y_{ROI}$, $Cb_{ROI}$, and $Cr_{ROI}$ denote average values of the color values Y, Cb, and Cr of the ROI. $Y_{in}$, $Cb_{in}$, $Cr_{in}$ denote the color values Y, Cb, and Cr of a point on a line. The $w_l$ denotes a weight value of the Y value. When an input finger image is received in accordance with a guide shape, the point on lines established on the finger top edge parts 502-504 has a large signal pattern value "Dist" at a point corresponding to a background region, whereas the point has a small signal pattern value "Dist" at a point corresponding to a finger region. Thus, when the number of a crossing point and a predetermined threshold value is 1, based on the signal pattern value on the lines, the electronic device recognizes an input of an image of a suitable finger.

Therefore, the electronic device analyzes patterns of a gradient signal of lines across the finger guide and a signal of lines placed on finger top edge parts and determines whether an input image received by a camera is suitable for fingerprint recognition.

However, the present invention is not limited to the color values Y, Cb, and Cr. Color values R, G, and B may be used to calculate the signal pattern value "Dist" and the gradient signal value "Gradient (x)."

Figure 7:
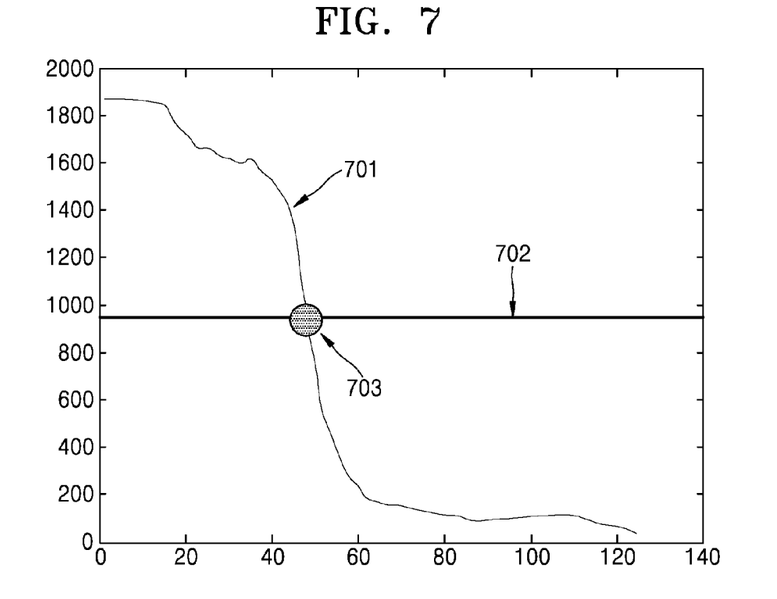
FIG. 7 is a graph illustrating a signal pattern value according to a position on a line placed at a finger top end point calculated when determining whether an input image that is received by a camera and input is suitable for fingerprint recognition, according to an embodiment of the present invention.

FIG. 7 is a graph illustrating the signal pattern value according to a position on a line placed at a finger top end point calculated when determining whether an input image that is received by a camera and input is suitable for fingerprint recognition, according to an embodiment of the present invention.

Referring to FIG. 7, the graph shows the signal pattern value with respect to a variation of the position on the line among the lines 502, 503, and 504 placed on a finger top edge part. With respect to an x axis, 0 represents a point on a background of the line placed on the finger top gradient part, and an x value increases according to approach to a finger region of a user along the line. The signal pattern value "Dist" is value in a y axis.

A pattern value of a line signal on a line established on a finger edge part may have a high value corresponding to a background in the left of a point 701, and a pattern value of a line signal on a line established on a finger edge part may have a low value corresponding to a skin foreground in the right of the point 701. Thus, the line is divided into a background region and a hand region. The number of a threshold value 702 and a crossing point 703 on the line of each finger edge gradient part is 1, and thus the input image received by the camera may be determined as being suitable for the fingerprint recognition.

Figure 8:
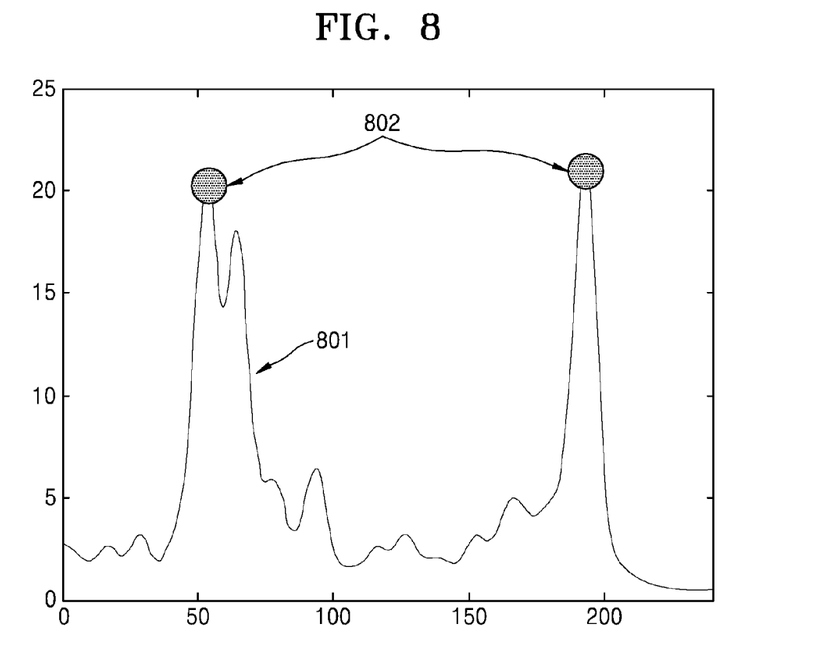
FIG. 8 is a graph illustrating a gradient signal value according to a position on a line that crosses a finger guide calculated when determining whether an image that is received by a camera and input is suitable for fingerprint recognition, according to an embodiment of the present invention.

FIG. 8 is a graph illustrating the gradient signal value according to a position on a line across a finger guide calculated when determining whether an input image that is received by a camera and input is suitable for fingerprint recognition, according to an embodiment of the present invention.

Referring to FIG. 8, the graph shows the gradient signal value "Gradient (x)" with respect to a variation of the position on the line among the lines 505 across the finger guide.

With respect to an x axis, 0 presents a point of a left bottom of the line 505 across the finger guide, and an x value increases according to approach to a right top along the line 505. 0 represents the gradient signal value "Gradient (x)" in a y axis. 0 has a low gradient value 801 on each finger and has a high gradient value 802 between the fingers. Thus, an electronic device determines whether an edge point 802 between the fingers is present from an established line. That is, the electronic device determines that the input image received by the camera is suitable for the fingerprint recognition if the point 802 having the highest gradient value is within a predetermined range from a position of a guide used to distinguish fingers. For example, referring to FIG. 5, when the width of the middle finger guide is L, and the point 802 having the highest gradient value is within a range 506 having a length of 0.5 L with respect to the guide used to distinguish fingers, the electronic device determines that the input image received by the camera is suitable for the fingerprint recognition.

The electronic device determines whether an input image received by a camera is suitable for fingerprint recognition by establishing a 1-D line, but the present invention is not limited thereto. The electronic device determines whether an input image received by a camera is suitable for fingerprint recognition by establishing a 2-D region.

In accordance with embodiments of the present invention, when the electronic device determines that the input image received by the camera is suitable for the fingerprint recognition and a focus of the camera installed in a cellular phone is adjustable, the electronic device adjusts the focus of the camera. After adjusting the focus, the electronic device determines that an input image received by the camera is suitable for the fingerprint recognition and performs the fingerprint recognition on the image. If the electronic device determines that the input image received by the camera is not suitable for the fingerprint recognition, the electronic device repeats the process described above to receive an input image by which the fingerprint recognition may be more accurately performed, through the camera.

Figure 9:
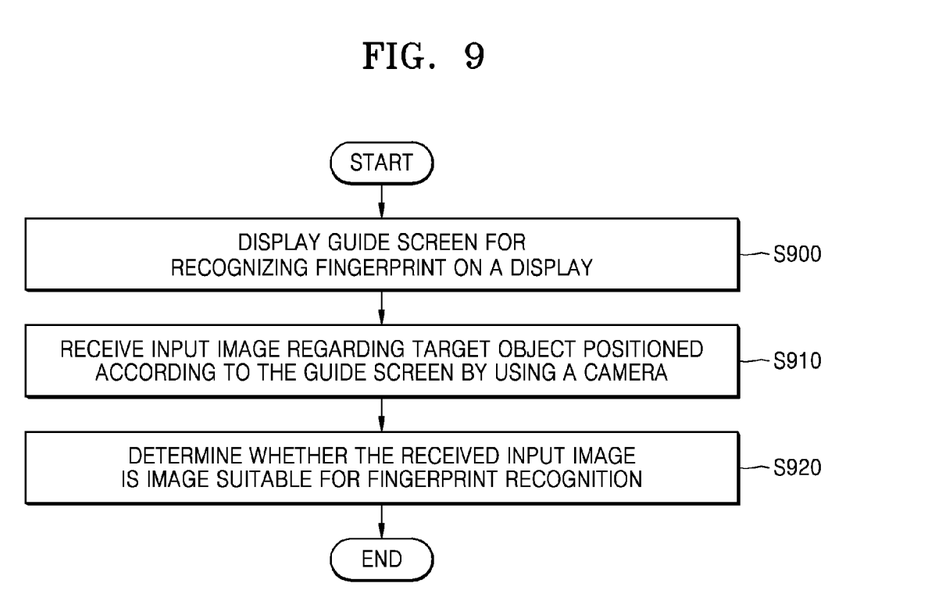
FIG. 9 is a flowchart illustrating a method of recognizing a contactless fingerprint, according to an embodiment of the present invention.

FIG. 9 is a flowchart illustrating a method of receiving an input contactless fingerprint recognition image, according to an embodiment of the present invention.

The method of recognizing the contactless fingerprint of the present embodiment is the same as the electronic device 100 of FIG. 1, in terms of the technical idea. Thus, a redundant description of the method of recognizing the contactless fingerprint of FIG. 9 and the electronic device of FIG. 1 is omitted. Hereinafter, the method of recognizing the contactless fingerprint of FIG. 9 will now be described with reference to the electronic device 100 of FIG. 1.

In operation S900, the electronic device 100 displays a guide screen, e.g., screen guide 300, 400, for recognizing the fingerprint on a display.

When the electronic device 100 recognizes a user's hand on an input image regarding a target object received by a camera, the electronic device 100 displays a guide screen for recognizing the fingerprint on a display.

In operation S910, the electronic device 100 receives an input image regarding a target object positioned according to the screen guide by using the camera, in a manner as described above.

In operation 920, the electronic device 100 determines whether the input image is suitable for fingerprint recognition. In this regard, the electronic device 100 determines whether the received input image is an image indicating a user's hand and if determined that the received input image is an image indicating a user's hand, the electronic device 200 determines whether the input image is an image suitable for a fingerprint recognition according to a position of the target object on the image.

Specifically, the electronic device 100 determines whether the image is an image suitable for fingerprint recognition according to the position of the user's finger top part or the position between a user's fingers on the image.

The electronic device 100 establishes a predetermined region on the image regarding the target object. For example, the electronic device 100 establishes the predetermined region on the image in correspondence to a region across an outline of a hand image displayed on the guide screen.

Also, the electronic device 100 analyzes a color value difference in the predetermined region. More particularly, the electronic device 100 establishes an ROI, calculates an average value of color values included in the established ROI, calculates a color value difference, and analyzes the color value difference in the predetermined region based on the color value difference. The electronic device 100 determines whether the received image is an image suitable for a fingerprint recognition based on the analyzed color value difference in the predetermined region.

The electronic device 100 establishes a predetermined region on the input image regarding the target object. For example, the electronic device 100 establishes the predetermined region on the input image in correspondence to a region across a plurality of fingers displayed on the guide screen. The electronic device 100 detects an edge in the predetermined region. The electronic device 100 calculates a difference in a color value between a region and a neighboring region of the region included in the predetermined region, and detects the edge in the predetermined region based on the calculated difference in the color value. When a difference in the brightness calculated in correspondence to the region in a predetermined has a greater value than that of a difference in the brightness calculated in correspondence to another region, the electronic device 100 determines whether the region is in a specific region and detects the edge in the predetermined region. In this regard, the specific region may be a region on the input image established in correspondence to a region including outlines between the fingers displayed on the guide screen.

Figure 10:
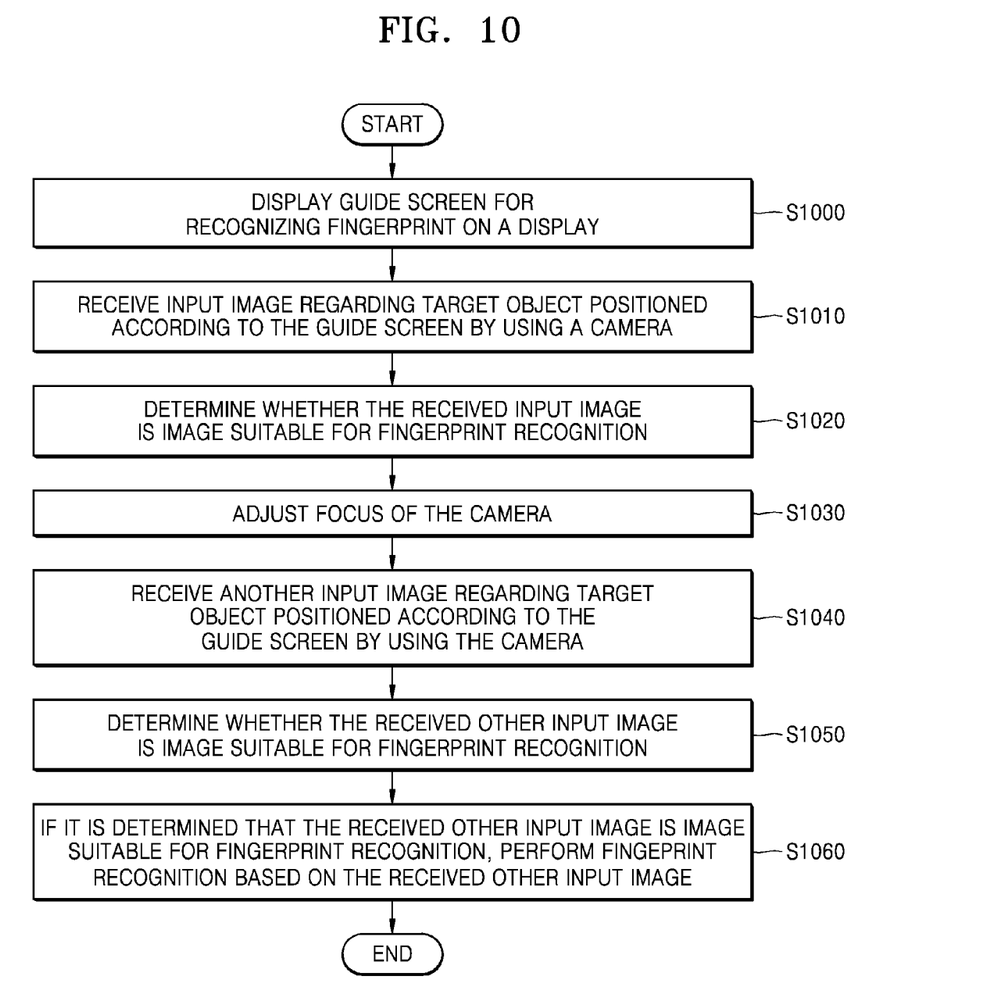
FIG. 10 is a flowchart illustrating a method of recognizing a contactless fingerprint, according to another embodiment of the present invention.

FIG. 10 is a flowchart illustrating a method of recognizing a contactless fingerprint, according to another embodiment of the present invention.

The method of acquiring the contactless fingerprint recognition image of the present embodiment is the same as the electronic device 200 of FIG. 2, in terms of the technical idea. Thus, a redundant description of the method of acquiring the contactless fingerprint recognition image of FIG. 10 and the electronic device of FIG. 2 is omitted. Hereinafter, the method of acquiring the contactless fingerprint recognition image of FIG. 10 will now be described with reference to the electronic device 200 of FIG. 2.

In operation S1000, the electronic device 200 displays a guide screen, e.g., the guide screens 300, 400, for recognizing fingerprint on a display. When the electronic device 200 recognizes a user's hand on an input image regarding a target object received by a camera, the electronic device 200 displays the guide screen for recognizing fingerprint on display. Also, the electronic device 200 displays the guide screen inclined at a predetermined angle with respect to a vertical central axis of an apparatus on which the guide screen is displayed. In this regard, the apparatus on which the guide screen is displayed may be the electronic device 200.

In operation S1010, the electronic device 200 receives an input image regarding a target object positioned according to the guide screen by using a camera.

In operation S1020, the electronic device 200 determines whether the received input image is the image which is suitable for the fingerprint recognition.

In operation S1030, the electronic device 200 adjusts a focus of a camera.

In operation S1040, the electronic device 200 receives another input image with respect to the target object positioned according to the guide screen by using the camera.

In operation S1050, the electronic device 200 determines whether the other input image is the image which is suitable for the fingerprint recognition.

In operation S1060, if the electronic device 200 determines that the other input image is the image which is suitable for the fingerprint recognition, the electronic device 200 performs fingerprint recognition by using the other input image. In this regard, the electronic device 200 extracts the feature of fingerprint included in the other input image, and stores information about the extracted feature of the fingerprint.

In accordance with the embodiments of the present invention described herein, a camera installed in an electronic device, e.g., the electronic devices 100, 200, may be used to perform fingerprint recognition without having to use a dedicated sensor, and thus it is advantageous in terms of expenses associated with conventional electronic devices that use a dedicated sensor. Also, the electronic devices 100, 200 evaluate quality of a fingerprint recognition image, acquire a fingerprint image, increase a user convenience, and increase fingerprint recognition rate.

In addition, embodiments in accordance with the present invention can also be implemented through computer readable code/instructions in/on a medium, e.g., a computer readable medium, to control at least one processing element to implement any of the embodiments of the present invention herein described. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and their equivalents.

What is claimed is:

1. A method of recognizing a contactless fingerprint, the method comprising:
    displaying a guide screen for recognizing the contactless fingerprint on a display;
    receiving an input image of a target object positioned according to the guide screen by using a camera; and
    establishing a predetermined region on the input image with respect to the target object;
    calculating a color value difference between the predetermined region and a region of interest (ROI) based on a brightness difference between the predetermined region and the ROI and a weighed value of the brightness difference;
    analyzing the color value difference in the predetermined region based on the calculated color value difference; and
    determining whether the received input image is suitable for fingerprint recognition based on the analyzed color value difference.

2. The method of claim 1, wherein determining whether the received input image is suitable for fingerprint recognition comprises:
    determining whether the input image is an image indicating a user's hand; and
    if it is determined that the input image is an image indicating a user's hand, determining whether the received input image is suitable for fingerprint recognition according to a position of the target object.

3. The method of claim 2, wherein displaying the guide screen comprises:
    displaying the guide screen if the user's hand is recognized in the input image with respect to the target object.

4. The method of claim 1 further comprising:
    adjusting a focus of the camera;
    receiving another input image of the target object positioned according to the guide screen by using the camera;
    determining whether the other input image is suitable for fingerprint recognition; and
    if it is determined that the other input image is suitable for fingerprint recognition, performing fingerprint recognition based on the other input image.

5. The method of claim 4, further comprising:
    storing feature information by extracting a feature of fingerprint included in the other image.

6. The method of claim 1, wherein determining whether the received input image is suitable for fingerprint recognition comprises:
    separating a background and a foreground of the input image based on the analyzed color value difference.

7. The method of claim 1, wherein the ROI is established with respect to the target object, and wherein calculating the color value difference comprises:
    calculating an average value of color values included in the established ROI and calculating a difference between the calculated average value of the color values and a color value of a partial region included in the predetermined region.

8. The method of claim 1, further comprising:
detecting an edge in the predetermined region; and
determining whether the received input image is suitable for fingerprint recognition based on the detected edge.

9. The method of claim 8, wherein detecting the edge in the predetermined region comprises:
calculating a difference in a brightness value between a region of the predetermined region and a neighboring region of the region of the predetermined region; and
detecting the edge in the predetermined region based on the calculated difference in the brightness value.

10. An electronic device comprising:
a display configured to display a guide screen for recognizing a contactless fingerprint on a display;
an image inputter configured to receive an input image of a target object positioned according to the guide screen by using a camera; and
a determinater configured to determine whether the received input image is suitable for fingerprint recognition, to establish a predetermined region on the input image with respect to the target object, to calculate a color value difference between the predetermined region and a region of interest (ROI) based on a brightness difference between the predetermined region and the ROI and a weighed value regarding the brightness difference, to analyze a color value difference in the predetermined region based on the calculated color value difference, and to determine whether the received input image is suitable for fingerprint recognition based on the analyzed color value difference.

11. The electronic device of claim 10, wherein the determinater determines whether the input image is an image indicating a user's hand, and if it is determined that the input image is the image indicating the user's hand, determines the input image is suitable for fingerprint recognition according to the position of the target object on the input image.

12. The electronic device of claim 11, wherein the ROI is established with respect to the target object, and the determiner calculates an average value of color values included in the established ROI and calculates a difference between the calculated average value of the color values and a color value of a partial region included in the predetermined region, and analyzes the color value difference in the predetermined region based on the calculated difference.

13. The electronic device of claim 10, further comprising:
a controller configured to adjust a focus of the camera;
a second image inputter configured to receive another input image of the target object according to the guide screen by using the camera; and
a fingerprint recognizer configured to perform fingerprint recognition based on the second image inputter, if it is determined that the other input image is suitable for fingerprint recognition,
wherein the image inputter receives the other input image of the target object positioned according to the guide screen by using the camera, and the determinater determines whether the other input image is suitable for fingerprint recognition.

14. The electronic device of claim 10, wherein the determinater detects an edge in the predetermined region, and determines whether the received input image is suitable for fingerprint recognition based on the detected edge.

15. The electronic device of claim 14, wherein the determinater calculates a difference in a brightness value between a region of the predetermined region and a neighboring region of the region, and detects the edge in the predetermined region based on the calculated difference in brightness value.

16. The electronic device of claim 10, further comprising:
a controller configured to display the guide screen inclined at a predetermined angle with respect to a vertical central axis of the electronic device, on which the guide screen is displayed.

17. A non-transitory computer readable recording medium having recorded thereon a program for executing a method of recognizing a contactless fingerprint, the method comprising:
displaying a guide screen for recognizing the contactless fingerprint on a display;
receiving an input image of a target object positioned according to the guide screen by using a camera; and
establishing a predetermined region on the input image with respect to the target object;
calculating a color value difference between the predetermined region and a region of interest (ROI) based on a brightness difference between the predetermined region and the ROI and a weighed value regarding the brightness difference;
analyzing a color value difference in the predetermined region based on the calculated color value difference; and
determining whether the received input image is suitable for fingerprint recognition based on the analyzed color value difference.

* * * * *